(12) United States Patent
Appleyard (10) Patent No.: US 7,351,948 B2
(45) Date of Patent: Apr. 1, 2008

(54) SAFETY SYSTEM AND METHOD UTILIZING MULTIPLE LASER BEAMS FOR AN INDUSTRIAL MACHINE

(75) Inventor: Robert Appleyard, Hillarys, W.A. (AU)

(73) Assignee: Lazer Safe PTY Lt., Malaga. W.A. (AU)

( * ) Notice: Subject to any disclaimer, the term of this patent is extended or adjusted under 35 U.S.C. 154(b) by 199 days.

(21) Appl. No.: 10/509,166

(22) PCT Filed: Mar. 27, 2003

(86) PCT No.: PCT/AU03/00372

§ 371 (c)(1),
(2), (4) Date: Sep. 27, 2004

(87) PCT Pub. No.: WO03/080268

PCT Pub. Date: Oct. 2, 2003

(65) Prior Publication Data

US 2006/0006315 A1    Jan. 12, 2006

(30) Foreign Application Priority Data

Mar. 27, 2002    (AU) .................................. PS 1409

(51) Int. Cl.
*G06M 7/00* (2006.01)
*G01N 21/86* (2006.01)
*G08B 29/00* (2006.01)
*F16D 63/00* (2006.01)
*F16D 3/06* (2006.01)
*B21J 7/46* (2006.01)

(52) U.S. Cl. .................. 250/221; 250/559.4; 340/507; 192/116.5; 192/129 R; 72/441

(58) Field of Classification Search ................ 250/221, 250/559.12, 559.13, 222.1, 216, 559.4; 340/507, 340/512; 361/170, 173–177; 192/116.5, 192/129 R, 130, 129 A, 146, 144; 72/441, 72/429
See application file for complete search history.

(56) References Cited

U.S. PATENT DOCUMENTS 3,704,396 A     11/1972   MacDonald ................ 361/175
3,750,436 A *   8/1973    Harrison et al. ............. 72/17.1
4,007,992 A *   2/1977    Petrohilos et al. .......... 356/640

(Continued)

FOREIGN PATENT DOCUMENTS

AU    B-27084/92    4/1993

(Continued)

*Primary Examiner*—Que Tan Le
*Assistant Examiner*—Pascal M Bui-Pho
(74) *Attorney, Agent, or Firm*—Woodcock Washburn LLP (57) ABSTRACT

A method of operating a safety system for an industrial press having a moveable section and a stationary section, the safety system providing a plurality of continuous planar laser beams having a generally constant lateral width, each laser beam being spaced at varying distances from the moveable section, the method including moving the moveable section towards the stationary section at a relatively high speed; starting deceleration of the moveable section when one said laser beam reaches a speed control point located immediately adjacent the stationary section, moving the moveable section at a final crawl speed when a second said laser beam reaches the speed control point, the moveable section continuing to move at said final crawl speed towards said stationary section.

100 Claims, 4 Drawing Sheets

U.S. PATENT DOCUMENTS

| | | | |
|---|---|---|---|
| 4,127,771 A | 11/1978 | Sick | 250/221 |
| 4,170,417 A * | 10/1979 | Tourres | 356/634 |
| 4,249,074 A | 2/1981 | Zettler et al. | 250/221 |
| 4,357,820 A | 11/1982 | Blanchard | 72/389.4 |
| 4,489,578 A * | 12/1984 | Nagai et al. | 72/21.1 |
| 4,527,684 A | 7/1985 | Eggeman et al. | 192/130 |
| 5,579,884 A | 12/1996 | Appleyard et al. | 192/130 |
| 6,124,586 A * | 9/2000 | De Coi | 250/221 |
| 6,389,860 B1 | 5/2002 | Stalzer | 72/1 |
| 6,677,574 B2 * | 1/2004 | Fiessler | 250/221 |
| 6,752,253 B2 * | 6/2004 | Fiessler | 192/130 |

FOREIGN PATENT DOCUMENTS

| | | |
|---|---|---|
| DE | 197 17 299 C2 | 3/2002 |
| EP | 7 891 82 A1 | 8/1997 |
| FR | 2 540 224 A | 3/1984 |
| GB | 1 307 078 | 2/1973 |
| WO | WO 97/25568 A1 | 7/1997 |
| WO | WO 00/67932 A1 | 11/2000 |

* cited by examiner

SAFETY SYSTEM AND METHOD UTILIZING MULTIPLE LASER BEAMS FOR AN INDUSTRIAL MACHINE

This is a 371 U.S. National Phase of International Application Number PCT/AU03/00372 filed Mar. 27, 2003, which claims priority to Australian Number PS 1409 filed Mar. 27, 2002.

The present invention is generally directed to safety systems used in industrial applications, and in particular to safety systems for use on industrial presses such as a press brake or guillotine. Although the present invention will now be described with respect to press brakes, it is to be appreciated that other applications of the present invention are also envisaged.

The Applicant has developed an industrial press safety system utilising a laser emitting a single continuous planar laser beam having a generally constant lateral width and a light receiver for the laser. Both the laser and the light receiver are mounted on the moveable section of the industrial press. In the case of a press brake, the laser and light receivers are mounted on the moveable tool, and the tool (and laser and light receiver mounted thereon) moves relative to a stationary anvil section. This safety system is described in International Patent Application PCT/AU00/00420, details of which are incorporated herein by reference.

The safety system acts to prevent operators of the press brake from accidentally trapping their hands or other objects between the tool and anvil while operating the press brake. This is achieved by locating the planar laser beam between the tool and the anvil. Any breaking of the laser beam path by an object is detected by the safety system which acts to immediately stop further movement of the tool. The safety system operates in this manner during the movement of a tool towards the anvil until the tool is in close proximity to the anvil. At that time, the safety system must slow the speed of movement of the tool and shut off the laser to allow the tool to complete its bending operation on a plate or other object located over the anvil. A speed control point is preset by the operator a small distance above the anvil and generally coincides with the top surface of the workpiece on the anvil.

The brake press using a safety system as described above can typically operate using the following operational cycle:

a) If no obstruction is detected during the downward travel of the tool, then the tool moves at high speed (typically about 150 mm/s) towards the anvil. When the laser beam, which is located below the tool, passes the speed control point, the tool slows to a crawl speed (typically about 10 mm/s). The slowing of the tool speed ensures that there is still sufficient time to withdraw a finger or other object from under the tool at the final approach of the tool to the anvil.

b) If an obstruction is detected, the tool will be stopped and reversed a few millimetres so that the tool will not touch the obstruction. The movement of the tool can be continued by the operator using a foot switch. If a further obstruction is detected, then the tool is stopped but not reversed. This enables thicker workpieces to be processed as the operator will allow completion of the cycle by actuating the foot switch to thereby move the tool at crawl speed.

The above described operating cycle is the normal mode of operation. Other operational cycles can alternatively be used, for example, a "tray mode" for the production of trays or boxes. This tray mode is described in the above noted International Patent Application and will not be described in detail here.

The aim of our device is to protect the operator of the press brake at all times. It is considered that the operator is protected if the press is slowed to 10 mm/sec (with tolerance) or if a physical barrier or a light sensing device including our type of system is active. Therefore to provide this continuous protection we slow the press brake to 10 mm/sec before we switch off, or desensitize (mute is a word that is sometimes commonly used) our laser beam or beams.

The spacing between the laser beam relative to a leading edge of the tool is generally the distance at which the tool must step at high speed. The spacing of the laser beam can for example be set at about 9.0 mm, and the tool controlled to be able to stop with a distance less than the above noted spacing, for example about 8.5 mm. It would however be advantageous to be able to operate the brake press at higher speeds to reduce production times. To this end, it is envisaged that the high speed of the travel of the tool be increased to about 200 to 220 mm/s as compared with 150 mm/s of current press brakes. This however makes it more difficult to use the above described safety system because the laser beam would need to be located further away from the tool to provide for an acceptable stopping distance for the tool. This however results in the crawl speed of the tool being activated earlier when the laser reaches the speed control point thereby lengthening the time when the tool is moving at the crawl speed. This at least reduces the benefit achieved in faster production lines due to the higher tool travel speed.

It is therefore an object of the present invention to provide an improved safety system for an industrial press that allows the press to operate at higher speeds thereby facilitating shorter production times.

It is another object of the present invention to provide an improved means of operating a safety system for an industrial press to thereby allow for the press to operate at higher speeds.

With this in mind, according to one aspect of the present invention, there is provided a safety system for an industrial press having a moveable section, the safety system including a laser device for emitting a plurality of parallel continuous planar beams having a generally constant lateral width;

a light receiver for receiving the planar beams and for detecting when an object intersects at least one of the planar beams; and a controller for stopping or preventing motion of the moveable section when the receiving means detects that at least one of the planar beams has intersected an object, said controller further adapted to decelerate the moveable section from a first speed to a second speed within a deceleration zone said zone defined between a first point at which a first planar beam passes a speed control point and a second point at which a second planar beam passes the speed control point.

The laser device and the light receiver may be similar in construction to those described in the above noted International patent application. The laser device according to the present invention may however emit a plurality of said continuous planar laser beams, the laser beams being position at least generally parallel relative to each other. The use of a single laser device to emit the laser beams facilitates correct alignment of the laser beams relative to each other. To this end, the laser device may include a plurality of laser emitters for respectively emitting a laser beam, and a lens assembly for respectively converting each said laser beam emitted from a said laser emitter to a said continuous planar laser beam. The lens assembly may include a cylindrical prism for initially expanding the or each laser beam into a planar fan shaped laser beam, and a converging lens for refocussing the fan shaped laser beam to a planar laser beam having a generally constant lateral width. The same lens assembly may be used to convert each laser beam to facilitate the correct alignment of the final planar laser beams. It is however also envisaged that a series of laser devices be used to provide the continuous planar laser beams. The use of planar laser beams provides a greater area of protection for the operator the laser beams preferably extending laterally beyond opposing sides of the moveable section. The laser beams when intersected by an object are also visible to the operator.

A single said light receiver may be used to receive the laser beams. The light receiver may include an array of light receiving elements, the elements being aligned along a common axis and located at an end of a receiver body of the light receiver. A cylindrical lens may be provided to focus the laser beam onto the light receiver array. This arrangement facilitates detection of the laser beams even when the industrial press is producing vibration within the safety system.

A single light receiver may be used to detect the plurality of planar laser beams. These laser beams may be multiplexed such that each laser beam is sequentially turned off and on so that the light receiver only detects one of said laser beams at any one time. It is however also to be appreciated that separate light receivers may be utilised for each said laser beam so that multiplexing is not necessary. Issues of alignment can be greater if more than one laser device and/or light receiver are used. Alternatively, a single light receiver having a plurality of cylindrical lens, each focussing a separate laser beam onto the light receiver array.

The industrial press may further include a stationary section, and the laser beams may be located between the moveable and stationary sections of the industrial press. The moveable section may include a leading edge, and each laser beam may be spaced at a different distance to the leading edge. Preferably, two said planar laser beams are emitted by the laser emitting means, with a first said planar laser beam being spaced further from the leading edge than a second said planar laser beam.

Safety systems having two beams are known with one such system described in German Patent DE 19717299 (Fiesller) the contents of which are incorporated herein by reference. In the Fiesiler system the two beams are separated by a "safety distance", being the distance in which the tool must stop before causing permanent injury. When the lower beam of the Fiesiler system is broken, the system shuts down the machine and so stopping the tool. However, the top beam is not a safety beam. Unlike the second beam described in the previous embodiment, the upper beam of the Fieslier system is used to measure the distance between the tool and the lower beam, that is the "safety distance". In calibrating the system the assembly for the safety system is raised until the upper beam is interrupted by the tool automatically setting the safety distance and so calibrating the tool. It follows therefore that the upper beam is distinct from a safety beam and, in fact, acts as a "limit switch" in order to calibrate the machine. During operation of the machine the upper beam remains inactive to the normal operation of the machine.

The safety system may define a speed control point close to the stationary section. When the moveable section initially approaches the stationary section, the moveable section may be initially moving at a relatively high speed. When the first planar laser beam reaches the speed control point, the moveable section may begin decelerating. That first planar beam is muted as it reaches the speed control point.

When the first planar beam is muted, whilst it has not been shut off, it does not act as a safety beam at this point. Instead it remains active for several reasons, possibly as a speed/distance/position measurement device. The system may be placed into a "test mode" by pressing a test button, on and depressing a foot switch (initiating a down or approach signal the tool is descended towards the bottom tool (anvil). The bottom tool has placed on it the work piece that is going to be bent (all subsequent bends are carried out on smaller thickness work pieces). As the top tool (with the laser at fixed distance from the leading edge of the tool) descends, and the laser obstructs a surface of work piece, this stops the tool. The test button is again pressed, and this confirms this point.

The system has now recorded the position of the top surface of the work piece. From this position the system then calculates a position a few mm's before this to establish the muting and crawl speed position. This position needs to be as low as possible but still have some tolerance for buckles or distortion in the work pieces. Once this position is "confirmed" as above the operator may continuously go through the bending process without interruption, as long as the work pieces remain at approximately the same thickness. If this thickness is changed then the test and confirmation may simply be retested.

The system may have further facility to aid in the maximum efficiency of a wife variety of press brakes. On a preferred embodiment dip switches in the control system, only accessible to the installer, that can distance the crawl point from the muting point. Some press brakes can change from high speed to slower speed very quickly, however many may take a longer time /distance to change. Therefore the setting of Dip switches can shift the crawl position above the mute position, for instance, in 2 mm increments up to say a total of 8 mm. This ensures that when the system carries out the speed check points, the press may be optimized to satisfy safety criteria and industry standards. By adjusting the rate the machine changes speed in the press itself (deceleration) against the crawl speed position a specific speed criteria, for instance, 50% of maximum or 25 mm/s may be achieved.

In a preferred embodiment when the first laser beam reaches the speed control point the speed of the tool is instantaneously checked to have slowed by approximately 20%. The crawl speed signal may be given just prior to this point (and can be adjusted further up with dip switches if necessary). Up until this first laser is "muted the stop safe distance fault indication is 13 mm (just less than the 14 mm be 4 am to tool tip). After the tool is slowing and only the second beam remains active this stop distance fault indication is changed to 8.5 mm.

As the tool progresses, the speed control point crosses the mid point between the two planar laser beams. At this point, a further instantaneous speed check is done to ensure the tool has decelerated to 50% of the maximum operating system and further that the maximum calculated stopping distance has now reduced to a second distance. In a further embodiment this mid point maximum stopping distance may be 8.5 mm.

As the second planar laser beam reaches the speed control point, a further instantaneous speed check is performed to ensure the tool is traveling at the final crawl speed, possibly 25 mm per second. In a more preferred embodiment, the final crawl speed may be 20 mm per second but not exceeding a threshold limit of 25 mm per second. At the final crawl speed, the maximum stopping distance must not exceed a final maximum stopping distance, which in one embodiment may be 4 mm, which is considered to contact the hand of an operator and perhaps pinch, but not cause permanent injury, to the hand.

As will be clear to a person skilled in the art, the instantaneous speed measurement may be the measurement of speed over a small finite distance and may be measured through the counting of pulses for a known pulse rate of the planar laser beams. In a further preferred embodiment, on exceeding any of the maximum speed limits or maximum stopping distances, the machine may be automatically shut down and consequently the instantaneous speed measurement may be a measure of compliance with said limits.

In a further preferred embodiment the permitted bend speed and so the speed at which the tool contacts and forms the material may be 20 mm per second. Alternatively, the permitted bend speed may be 10 mm per second whereupon the speed of the tool is further decelerated from the speed at which the second laser crosses the speed control speed decelerating further to 10 mm per second at which point the tool crosses the speed control point.

In one example arrangement, the first planar laser beam can be spaced about 14 mm from the leading edge of the moveable section, and the second laser beam can be spaced about 4 mm from the leading edge.

Because the first laser beam can be spaced further from the leading edge than the earlier safety system (typically 9.0 mm), a greater stopping distance can be provided. The speed of the moveable section can progressively decrease when the first laser beam reaches the speed control point so that the speed of the moveable section is not suddenly slowed. The speed of the moveable section may be typically about 40 to 50% of the initial high speed by the time the point between the first and second planar laser beam reaches the speed control point. When the second planar laser beam finally reaches the speed control point, the spacing between the moveable and the stationary section is preferably 6 mm or less and the moveable section may be moving at about 25 mm/s. When the moveable section is moving at this speed, it can still stop in less than 4 mm if the second planar laser beam is interrupted. The moveable section can at this point continue to move at the constant speed of 25 mm/s. Alternatively, the moveable section can continue to decelerate from 25 mm/s to 10 mm/s and then continue to move at this final speed. There is no need to further slow the moveable section because Industry Standards do not require the moveable section to be slowed when the spacing is 6 mm or less, this space being considered too narrow to allow any object to be trapped therebetween.

According to a second aspect of the present invention, there is provided a safety system for an industrial press having a moveable section, the safety system including a laser device for emitting a continuous beam of rectilinear cross-section having a generally constant lateral width and generally constant depth;

said rectilinear beam having a proximate and distal face relative to a leading edge of the moveable section;

a light receiver for receiving the rectilinear beam and for detecting when an object intersects at least a portion of the beam; and a controller for stopping or preventing motion of the moveable section when the receiving means detects that at least a portion of the rectilinear beam has intersected an object, said controller further adapted to decelerate the moveable section from a first speed to a second speed within a deceleration zone said zone defined between a first point at which the proximate face passes a speed control point and a second point at which the distal face passes the speed control point.

In the first aspect of the present invention the plurality of parallel continuous planar beams define an area having an upper and lower bound determined by the upper most and lower most beams. The width of the zone is defined by the lateral width of the plurality of beams which in combination with the upper and lower bounds defines in a preferred embodiment a rectilinear zone. In a more preferred embodiment the first aspect of the invention may have only two beams and so these two beams may define the upper and lower bounds. In the second aspect of the present invention this zone is defined by a single beam having both height and width dimensions and so defining the same zone as in the first aspect. However the single beam may provide further facility for detecting obstructions between the upper and lower bounds.

In a preferred embodiment of the first aspect of the invention as a beam passes the speed control point the relevant beam is switched off so as to prevent stopping of the tool as the relevant beam is obstructed by the work piece. For the second aspect of the present invention the analogous function of the rectilinear beam as it crosses the speed control point results in a progressive muting of the rectilinear beam such that the portion above the beam remains active and the portion below the beam remains in a muted form. In a more preferred embodiment the portion of the rectilinear beam below the speed control point may still function so as to pulse and therefore make speed measurement possible.

In a further preferred embodiment the rectilinear beam may be sized so as to extend beyond the upper bound associated with an upper beam of the first aspect of the invention. This extension of the rectilinear beam may terminate so as to intersect with the tip of the tool such that the tip of the tool obstructs a small portion of the rectilinear beam. Thus, positioning of the rectilinear beam relative to the tip of the tool may be located by adjustment of the single rectilinear beam. So as to ensure that this partial obstruction by the tool tip does not trigger stoppage of the tool receivers associated with the obstructions may be inactive whilst maintaining the remaining receivers in an active condition.

According to a third aspect of the present invention, there is provided a method of operating a safety system for an industrial press having a moveable section and a stationary section, the safety system providing a plurality of continuous planar laser beams having a generally constant lateral width, each laser beam being spaced at varying distances from the moveable section, the method including moving the moveable section towards the stationary section at a relatively high speed;

starting deceleration of the moveable section when one said laser beam reaches a speed control point located immediately adjacent the stationary section, moving the moveable section at a final crawl speed when a second said laser beam reaches the speed control point, the moveable section continuing to move at said final crawl speed towards said stationary section.

The moveable section may progressively decelerate until the final crawl speed is reached for the moveable section.

In a fourth aspect of the present invention there is provided a method for setting the safety distance between a single planar laser beam and a leading edge of a moveable section of an industrial press, the method including the steps of:

converging the planar beam along an axis parallel to the movement of the moveable section until the leading edge interrupts the planar beam;

diverging the planar beam away from the leading edge along the axis by a pre-determined distance, said pre-determined distance set as the safety distance.

Said method involves automatically raising a single planar beam until the leading edge of the tool intersects said beam. The control then lowers the emitter and receivers for the planar laser beam at a fixed distance established for the safety distance corresponding to the industrial press. Thus, for commissioning a new safety system, the safety system assembly may be mounted to the industrial press in an appropriate fashion and by manually, or preferably engaging an automatic commissioning controller, the controller will guide the necessary emitter and receiver relationship up to the leading edge of the tool until intersecting said beam. The automatic system, or manual adjustment, can then be similarly guided to a predetermined distance from the leading edge of the tool and thus establish the safety distance.

Whilst mounting any safety system will be of a similar intensity requiring labour and time, with systems of the past commissioning of said safety system can be equally labour intensive. With the present method, commissioning of the safety system is automated and thus is quick and straight forward.

It will be convenient to further describe the invention by reference to the accompanying drawings which illustrate an example arrangement of the present invention. Other arrangements of the invention are possible, and consequently the particularity of the accompanying drawings is not be understood to be superseding the generality of the preceding description of the invention.

Figure 1:
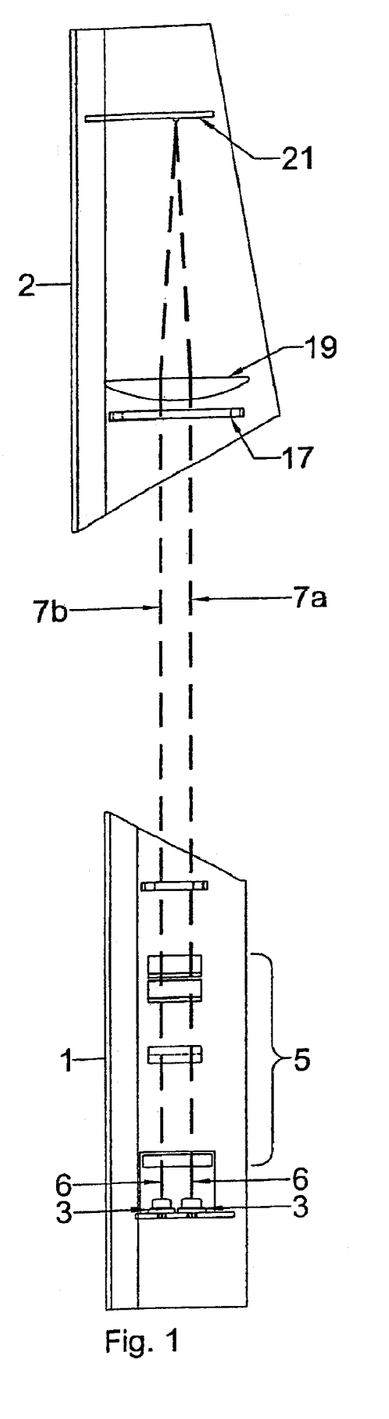
FIG. 1 is a side schematic view of the laser device and light receiver of the safety system according to a first aspect of the present invention.
Figure 2:
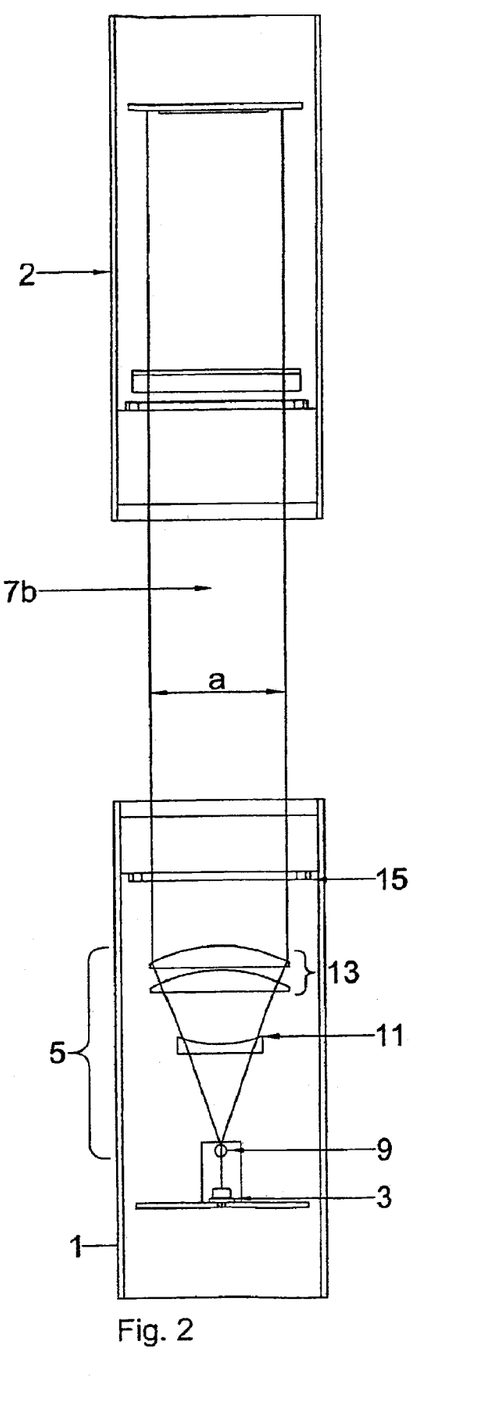
FIG. 2 is a plan schematic view of the laser device and light receiver of FIG. 1.

Referring initially to FIGS. 1 and 2, the safety system includes a laser device 1 and a light receiver 2. Both the laser device 1 and light receiver 2 are similar in construction to the arrangement shown in the Applicant's International Patent Application No. PCT/AU00/00420 and will not therefore be described in detail herein. The primary difference is that the laser device 1 includes a pair of laser emitters 3, each emitter 3 emitting a single laser beam 6. The laser beam 6 passes through a lens assembly 5 to convert that laser beam into a continuous planar laser beam 7a, 7b. The lens assembly 5 typically includes a cylindrical prism 9 for initially expanding the laser beam 6 into a planar fan shape beam. This beam is then passed through a converging lens 11 and focussing lens assembly 13 for converting the laser beam into said planar laser beam 7a, 7b. A window 15 is provided in front of the lens assembly, and the planar laser beam 7a, 7b passes through the window 15. This planar laser beam 7a, 7b can typically have a width "a" of about 50 mm.

Both of the laser beams 6 emitted by laser emitters 3 pass through the lens assembly 5 such that two separate planar laser beams 7a, 7b are emitted from the laser device 1. The laser beams 7a, 7b extend parallel to each other and laterally forwardly and rearwardly relative to the tool 25 as shown in FIG. 3.

The light receiver 2 includes a window 17 through which the laser beams 7a, 7b can pass, a cylindrical lens 19 for focussing the laser beams onto a light receiver array 21. These cylindrical lens 19 ensures that the laser beams 7a, 7b focussed on the light receiver array 21 even when there is vibration of the safety system during operation of the industrial press.

The laser beams may be multiplexed such that each laser emitter 3 is turned on and off sequentially so that only one laser beam 7a, 7b at any one time is received by the light receiver 2. The light receiver 2 therefore only detects a single laser beam 7a, 7b at any one time. This ensures that any interception of one or both laser beams 7a, 7b can be detected.

Figure 3:
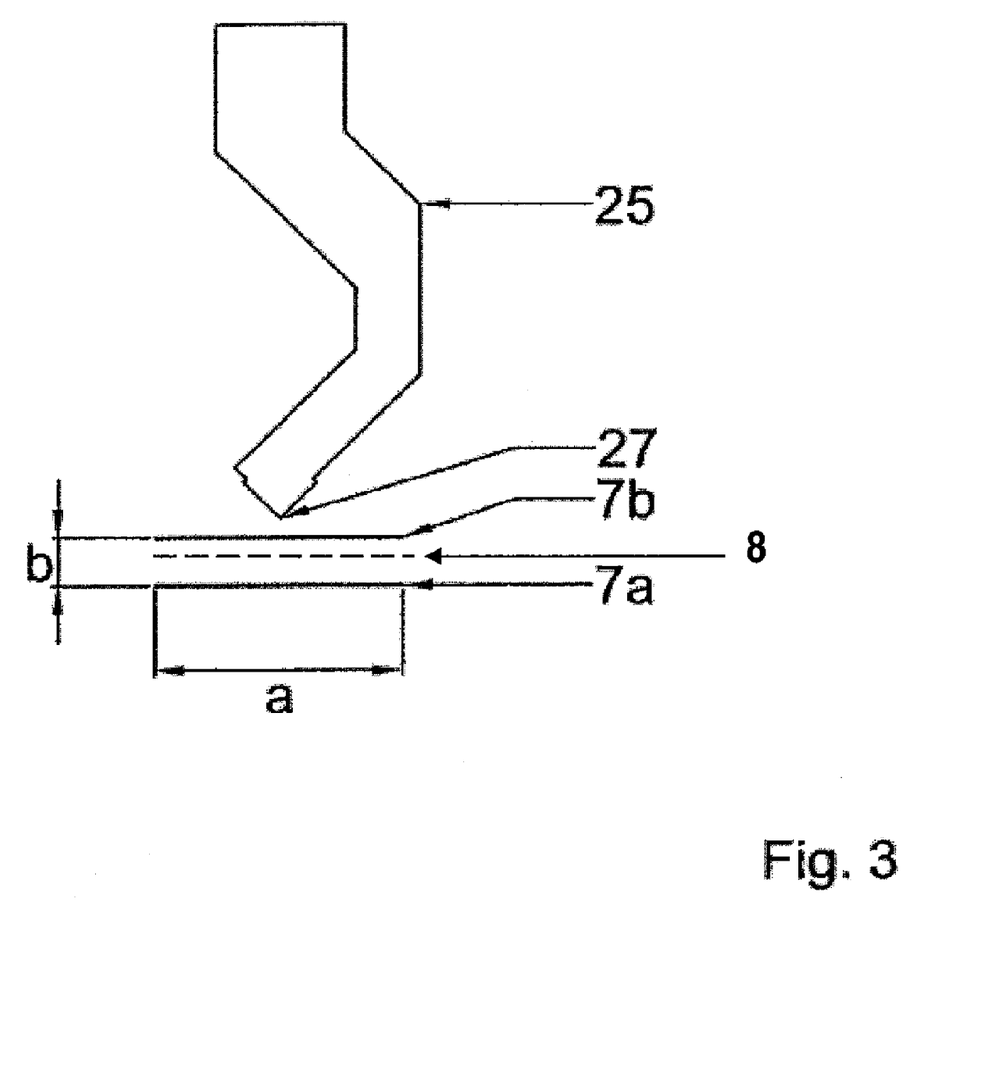
FIG. 3 is a detailed view of an industrial press tool showing the orientation of the planar laser beams according to a first aspect the present invention.

FIG. 3 shows in more detail the orientation of the planar laser beams 7a, 7b relative to a tool 25 of the moveable section of the industrial press. According to the present invention, the laser device 1 and light receiver 2 are both mounted and moveable together with the moveable section of the industrial press. Therefore, the planar laser beam 7a, 7b can be located at a preset spacing away from a peripheral edge 27 of the tool 25. In one example arrangement, the first planar laser beam 7a can be located approximately 14 mm from the tool peripheral edge 27. The second laser beam 7b can be located about 4 mm from the tool peripheral edge 27. There is therefore a spacing b of 10 mm between the first laser beam 7a and second laser beam 7b.

This arrangement facilitates the use of higher tool speeds for the moveable section of the industrial press. The moveable section can for example move at a downward speed of about 200-250 mm/s (compared with 150 mm/s of current press brakes). The location of the first laser beam 7a enables a longer stopping distance to be set in the system, for example, 13 mm.

During operation of the industrial press, when the first laser beam 7a reaches a speed control point 8 provided a short distance above a stationary section of the industrial press, the moveable section begins to decelerate and the first laser beam 7a is shut off. Therefore, as the tool 25 of the moveable section continues to move downwards, when the speed control point 8 is positioned intermediate the first laser beam 7a and the second laser beam 7b, the speed can be anywhere between 40 to 50% of the initial tool speed.

When the first planar beam 7a reaches the speed control point 8 the tool 25 is traveling at 100% of its operational speed. At this point an instantaneous speed check is conducted so as to ensure the maximum stopping distance at this speed is maintained at 13 mm.

As the tool 25 progresses, the speed control point 8 crosses the midpoint between the two planar laser beams 7b. At this point, a further instantaneous speed check is done to ensure the tool 25 has decelerated to 50% of the maximum operating system and further that the maximum calculated stopping distance has now reduced to 8.5 mm.

As the second planar laser beam 7b reaches the speed control point 8, a further instantaneous speed check is performed to ensure the tool 25 is traveling at the final crawl speed, possibly 25 mm per second. In a more preferred embodiment, the final crawl speed may be 20 mm per second but not exceeding a threshold limit of 25 mm per second. At the final crawl speed, the maximum stopping distance must not exceed a final maximum stopping distance, of 4 mm, which is considered to contact the hand of an operator and perhaps pinch, but not cause permanent injury, to the hand.

As will be clear to a person skilled in the art, the instantaneous speed measurement may be the measurement of speed over a small finite distance and may be measured through the counting of pulses for a known pulse rate of the planar laser beams. In a further preferred embodiment, on exceeding any of the maximum speed limits or maximum stopping distances, the machine may be automatically shut down and consequently the instantaneous speed measurement may be a measure of compliance with said limits.

In a further preferred embodiment the permitted bend speed and so the speed at which the tool 25 contacts and forms the material may be 20 mm per second. Alternatively, the permitted bend speed may be 10 mm per second whereupon the speed of the tool 25 is further decelerated from the speed at which the second laser crosses the speed control speed decelerating further to 10 mm per second at which point the tool 25 crosses the speed control point.

The present invention allows for more precise control of the speed of the moveable section, with the blade being initially decelerated and then moved at a final crawl speed. This helps to reduce the overall production cycle of the machine.

Figure 4:
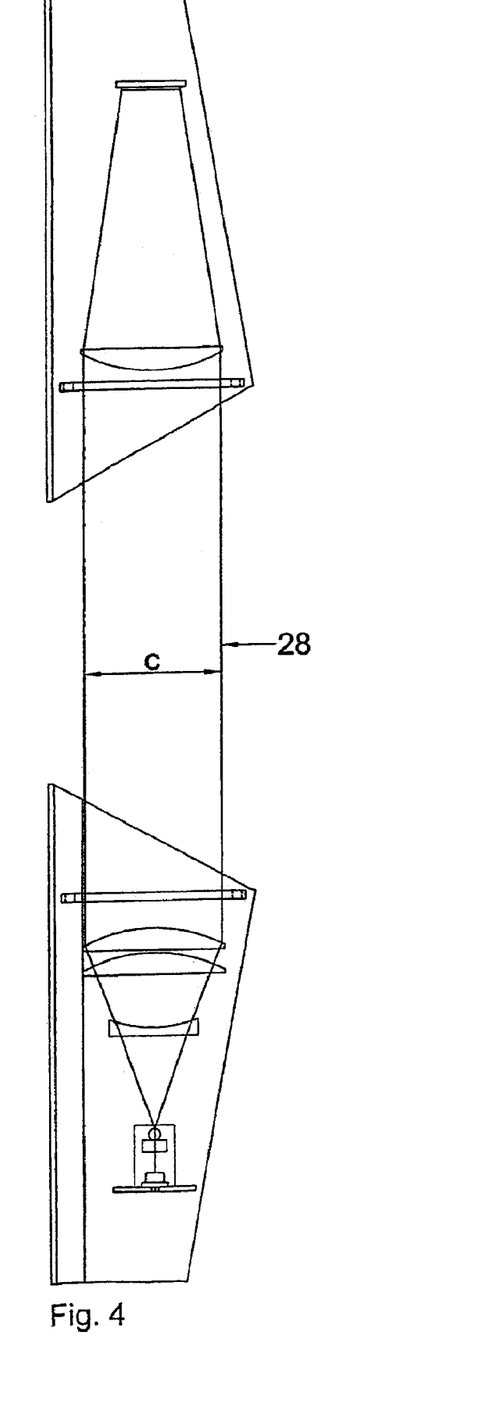
FIG. 4 is a side schematic view of the laser device and light receiver of the safety system according to a second aspect of the present invention.
Figure 5:
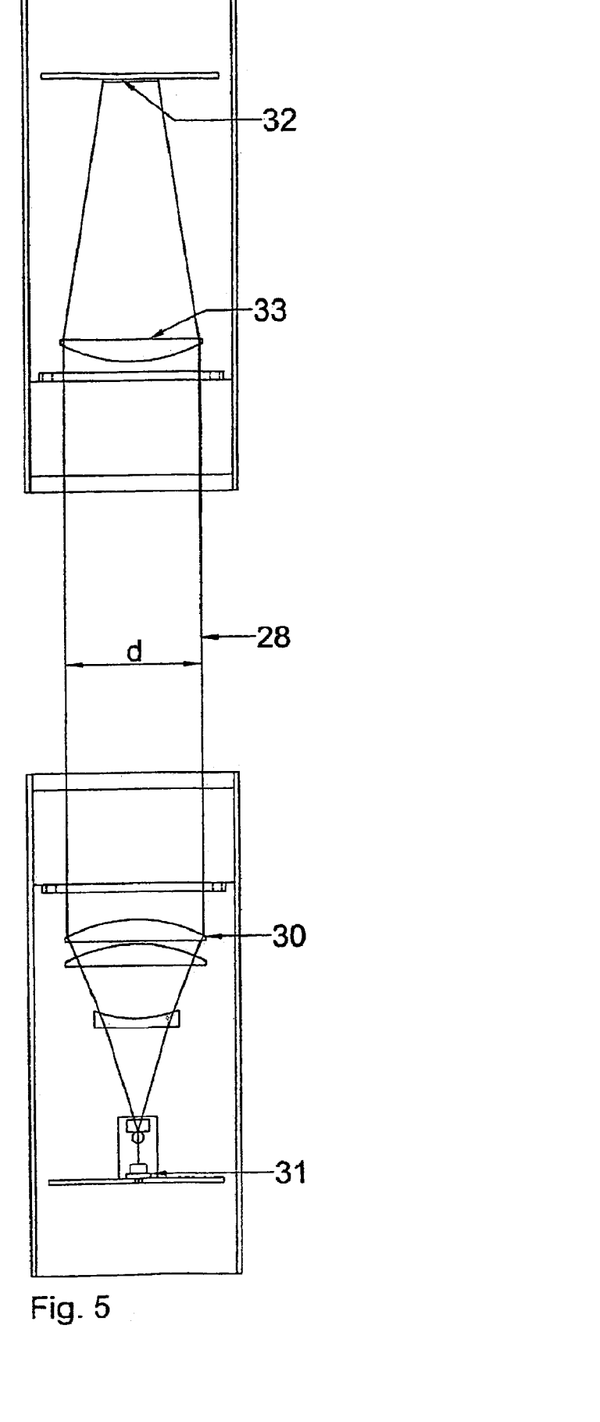
FIG. 5 is a plan schematic view of the laser device and light receiver of FIG. 4.

FIGS. 4 and 5 show a schematic view of the safety system according to a second aspect of the present invention whereby a rectilinear beam 28 having height dimension c and width d in the range of the action of the tool 25.

A laser 31 is passed through an arrangement of lenses 30 so as to create an expanded beam 28 of substantial height and width which is subsequently focused through a second arrangement of lenses 33 onto receivers 32.

Figure 6:
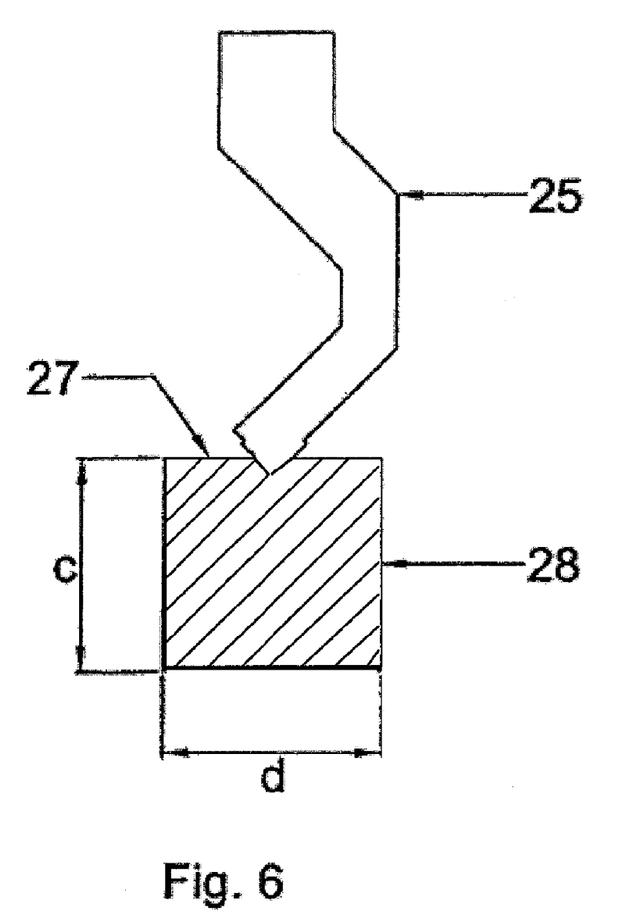
FIG. 6 is a detailed view of an industrial press tool showing the orientation of the rectilinear laser beam according to a second aspect of the present invention.

FIG. 6 shows the effect of the rectilinear beam as compared to the planar beam arrangement of the first aspect of the present invention. The planar beams 7a and 7b define upper and lower bounds of the safety zone in the second aspect of the present invention this zone is "filled in" by the manipulation of a single beam. The effect of having an enhanced safety zone remains similar to that of the first aspect and the benefits of having deceleration zone defined between the upper and lower bounds is maintained also. The primary difference in this case is firstly the safety zone is defined by a single emitter rather than dual emitters with the dual beam system and secondly the central active portion of the safety zone between lower bound 7a and upper bound 7b.

Figure 7:
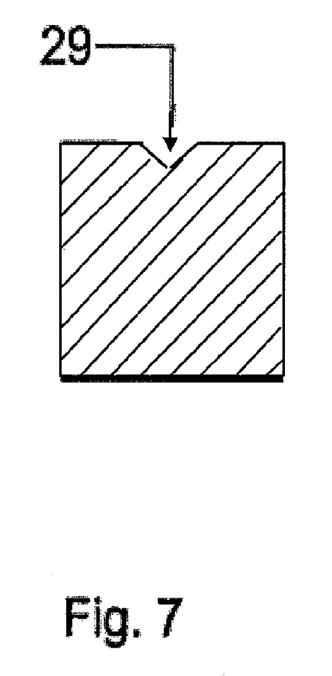
FIG. 7 is a detailed view of the rectilinear beam of FIG. 6.

In the preferred embodiment shown in FIGS. 6 and 7 a further adaptation of the system may be seen whereby the rectilinear beam 28 extends towards the tool 25 beyond the upper bond 7b recognized by the system shown in FIGS. 1 and 2. FIG. 6 shows the rectilinear beam 28 extending up to and fractionally beyond the tool tip 27 whereby the tool tip obstructs a small portion 29 of the rectilinear beam 28. This has the advantage of adjustment of the system such that on commissioning the safety system with a new press brake the position of the rectilinear beam 28 may be adjusted upwards until the tool tip 27 obstructs a portion 29 of the rectilinear beam. On registering this obstruction the system is initalized ready for use. This has distinct advantages over other systems in so far as the setting of this position is achieved through a single beam without sacrificing the protection offered by an expanded zone. In order to achieve this result the portion 29 of the rectilinear beam 28 will correspond to specific receivers which are inactive for the purposes of stopping the travel of the tool 25. Thus in operation the safety system remains having a portion 29 obstructed but with the corresponding receivers inactive for the purposes of safety the system will function until the remaining portion of the rectilinear beam is obstructed.

Modifications and variations as would be deemed obvious to the person skilled in the art are included within the ambit of the present invention.

The invention claimed is:

1. A safety system for an industrial press having a moveable section defining a leading edge and a stationary section, the safety system including:
   a laser device for emitting a plurality of parallel continuous planar beams having a generally constant lateral width; wherein the planar beams are located between the moveable and stationary sections of the industrial press and each planar beam is spaced at a different distance to the leading edge of the moveable section such that a first planar beam is spaced further from the leading edge than a second planar beam;
   a light receiver for receiving the planar beams and for detecting when an object intersects at least one of the planar beams; and
   a controller for stopping or preventing motion of the moveable section when the light receiver detects that at least one of the planar beams has intersected an object,
   said controller further adapted to decelerate the moveable section from a first speed to a second speed within a deceleration zone, said zone defined between a first point at which the first planar beam passes a speed control point and a second point at which the second planar beam passes the speed control point, wherein the first and second speeds of the moveable section are measured at the first and second points, respectively.

2. The safety system according to claim 1 wherein the first and second planar beams are adjacent.

3. The safety system according to claim 1 wherein the laser device includes a plurality of laser emitters for respectively emitting a laser beam and a lens assembly for respectively converting each said laser beam emitted from a said laser emitter to a said continuous planar laser beam.

4. The safety system according to claim 3 wherein the lens assembly includes a cylindrical prism for initially expanding each laser beam into a planar fan-shaped laser beam and a converging lens for refocusing the fan-shaped laser beam to a planar laser beam having a generally constant lateral width.

5. The safety system according to claim 4 wherein the lens assembly is used to convert each laser beam to facilitate the correct alignment of the final planar laser beam.

6. The safety system according to claim 1 further including a plurality of laser devices used to provide the continuous planar laser beams.

7. The safety system according to claim 4 wherein peripheral edges of the plane defined by the planar laser beam extend laterally beyond opposing sides of the moveable section.

8. The safety system according to any one of the preceding claims wherein a single light receiver is used to receive the planar beams.

9. The safety system according to claim 1 wherein the light receiver includes an away of light receiving elements, the elements being aligned along a common axis and located at an end of a receiver body of the light receiver.

10. The safety system according to claim 9 wherein a cylindrical lens is provided to focus the planar laser beams onto the light receiver array.

11. The safety system according to claim 1 wherein the planar laser beams are multiplexed such that each laser beam is sequentially turned off and on creating pulses so that the light receiver only detects one of said laser beams at one time.

12. The safety system according to claim 11 wherein the pulses are created at a pre-determined pulse rate.

13. The safety system according to claim 1 wherein the speed measurement is performed by the controller, said controller measuring a number of pulses at a pulse rate as the moveable section travels a predetermined distance, to determine the first and second speed measurement.

14. The safety system according to claim 13 wherein the predetermined distance is bisected by the speed control point, whereat a further speed measurement is conducted to determine that the deceleration of the moveable section had occurred.

15. The safety system according to claim 14 wherein the predetermined distance is a deceleration zone of 2 mm commencing 1 mm above the speed control point and finishing 1 mm below the speed control point.

16. The safety system according to claim 1 wherein the first speed is a maximum operating speed of the industrial press.

17. The safety system according to claim 16 wherein the second speed is a final crawl speed.

18. The safety system according to claim 17 wherein the controller decelerates the moveable section at a rate such that the speed of the moveable section as a mid point between the first point and second point passes the speed control point is 50% of the operating speed of the industrial press.

19. The safety system according to claim 17 wherein if the speed measurement detects a speed exceeding the first speed at the first point, the final crawl speed at the second point or 50% of the operating speed at the mid point, then the controller will stop the moveable section by shutting off the industrial press.

20. The safety system according to claim 17 wherein the final crawl speed is 20 mm per second.

21. The safety system according to claim 1 wherein as each planar beam passes the speed control point the respective planar laser beam is muted whereby intersection of the planar beam by the object will not prevent motion of the moveable section.

22. The safety system according to claim 21 wherein the muted planar laser beam is still pulsed and speed measurement is still possible.

23. The safety system according to claim 1 wherein the speed control point is located 2 mm above a surface of material operated on by the industrial press.

24. The safety system according to claim 1 wherein the first and second planar laser beams are spaced along an axis parallel to the movement of the moveable section by 10 mm.

25. The safety system according to claim 1 wherein the first planar laser beam and the moveable section are spaced along an axis parallel to the movement of the moveable section by 4 mm.

26. The safety system according to claim 1 wherein the controller further decelerates the moveable section from the second point to a third point, said third point located at which the leading edge of the moveable section passes the speed control point.

27. The safety system according to claim 26 wherein the moveable section is decelerated from 20 mm per second to 10 mm per second between the second point and the third point.

28. A safety system for an industrial press having a moveable section, the safety system including:
a laser device for emitting a continuous beam of rectilinear cross-section having a generally constant lateral width and generally constant depth;
said rectilinear beam having a proximate and distal face relative to a leading edge of the moveable section;
a light receiver for receiving the rectilinear beam and for detecting when an object intersects at least a portion of the beam; and
a controller for stopping or preventing motion of the moveable section when the light receiver detects that at least a portion of the rectilinear beam has intersected an object,
said controller further adapted to decelerate the moveable section from a first speed to a second speed within a deceleration zone, said zone defined between a first point at which the proximate face passes a speed control point and a second point at which the distal face passes the speed control point, wherein the first and second speeds of the moveable section are measured at the first and second points, respectively.

29. The safety system according to claim 28 wherein the speed measurement is performed by the controller measuring a number of pulses at a pulse rate as the moveable section travels a predetermined distance.

30. The safety system according to claim 29 wherein the predetermined distance is bisected by the speed control point.

31. The safety system according to claim 30 wherein the predetermined distance is 2 mm commencing 1 mm above the speed control point and finishing 1 mm below the speed control point.

32. The safety system according to claim 28 wherein the first speed is a maximum operating speed of the industrial press.

33. The safety system according to claim 32 wherein the second speed is a final crawl speed.

34. The safety system according to claim 33 wherein the controller decelerates the moveable section at a rate such that the speed of the moveable section at a mid point between the first point and second point that passes the speed control point is 50% of the operating speed of the industrial press.

35. The safety system according to claim 34 wherein if the speed measurement detects a speed exceeding the first speed at the first point, the final crawl speed at the second point or 50% of the operating speed at the mid point, then the controller will stop the moveable section by turning off the industrial press.

36. The safety system according to claim 35 wherein the final crawl speed is 20 mm per second.

37. The safety system according to claim 36 wherein the controller further decelerates the moveable section from the second point to a third point, said third point located at which the leading edge of the moveable section passes the speed control point.

38. The safety system according to claim 37 wherein the moveable section is decelerated from 20 mm per second to 10 mm per second between the second point and the third point.

39. The safety system according to claim 28 wherein as the rectilinear beam progressively passes the speed control point the rectilinear beam is correspondingly progressively muted whereby intersection of the rectilinear beam at a muted portion of the rectilinear beam by the object will not prevent motion of the moveable section.

40. The safety system according to claim 39 wherein the muted portion of the rectilinear beam is still pulsed and speed measurement is still possible.

41. The safety system according to claim 28 wherein the speed control point is located 2 mm above a surface of material operated on by the industrial press.

42. The safety system according to claim 28 wherein the depth of the rectilinear beam is 10 mm.

43. The safety system according to claim 28 wherein the proximate face and the moveable section are spaced along an axis parallel to the movement of the moveable section by 4 mm.

44. The safety system according to claim 28 wherein the laser device includes a plurality of laser emitters for respectively emitting a laser beam and a lens assembly for respectively converting each said laser beam emitted from a said laser emitter to a said continuous rectilinear laser beam.

45. The safety system according to claim 44 wherein the lens assembly includes a first cylindrical prism for initially expanding the or each laser beam into a planar fan-shaped laser beam in one plane, a first converging lens for refocusing the fan-shaped laser beam to a planar laser beam having the generally constant lateral width, a second cylindrical prism, orthogonal to the first cylindrical prism, for expanding the planar laser beam into a prismatic fan-shaped laser beam and a second converging lens for refocusing the prismatic fan-shaped laser beam to a rectilinear laser beam having both the generally constant lateral width and the generally constant depth.

46. The safety system according to claim 28 wherein the light receiver includes a two dimensional array of light receiving elements, the elements being placed in a rectilinear distribution and located at an end of a receiver body of the light receiver.

47. The safety system according to claim 28 said rectilinear beam further including a rectilinear portion of depth sufficient to span from the proximate face to a partial intersection with the leading edge of the moveable section, said rectilinear portion having the generally constant lateral width, wherein the light receiver further includes light receiving elements corresponding to the rectilinear portion, such that the light receiving elements corresponding to an area where the moveable section intersects with the rectilinear portion do not function to prevent movement of the moveable section.

48. A method of operating a safety system for an industrial press having a moveable section and a stationary section, the safety system providing a plurality of continuous planar laser beams having a generally constant lateral width, each laser beam being located between the moveable and stationary sections of the industrial press and spaced at varying distances from the moveable section such that a first laser beam is spaced further from the moveable section than a second laser beam, the first and second laser beams defining a deceleration zone, the method including moving the moveable section towards the stationary section at a relatively high speed;

starting deceleration of the moveable section to a first speed when the first laser beam reaches a speed control point located immediately adjacent the stationary section;

moving the moveable section at a final crawl speed when the second said laser beam reaches the speed control point, the moveable section continuing to move at said final crawl speed towards said stationary section;

measuring the first speed of the moveable section as the first laser beam reaches the speed control point; and measuring the final crawl speed of the moveable section as the second laser reaches the speed control point.

49. A method of operating a safety system for an industrial press having a moveable section and a stationary section, the safety system providing a plurality of continuous planar laser beams having a generally constant lateral width, each laser beam being spaced at varying distances from the moveable section, the method including moving the moveable section towards the stationary section at a relatively high speed;

starting deceleration of the moveable section when one said laser beam reaches a speed control point located immediately adjacent the stationary section;

moving the moveable section at a final crawl speed when a second said laser beam reaches the speed control point, the moveable section continuing to move at said final crawl speed towards said stationary section; and muting each laser beam as it passes the speed control point such that intersection of the laser beam by an object will not prevent motion of the moveable section.

50. A method of operating a safety system for an industrial press having a moveable section and a stationary section, the safety system providing a plurality of rectilinear laser beams having rectilinear cross-sections of generally constant lateral width and generally constant depth, each rectilinear laser beam being spaced at varying distances from the moveable section, the method including moving the moveable section towards the stationary section at a relatively high speed;

starting deceleration of the moveable section when one said rectilinear laser beam reaches a speed control point located immediately adjacent the stationary section;

moving the moveable section at a final crawl speed when a second said rectilinear laser beam reaches the speed control point, the moveable section continuing to move at said final crawl speed towards said stationary section; and measuring the first speed of the moveable section as the first laser beam reaches the speed control point; and measuring the second speed of the moveable section as the second laser beam reaches the speed control point.

51. A method of operating a safety system for an industrial press having a moveable section and a stationary section, the safety system providing a plurality of rectilinear laser beams having rectilinear cross-sections of generally constant lateral width and generally constant depth, each rectilinear laser beam being spaced at varying distances from the moveable section, the method including moving the moveable section towards the stationary section at a relatively high speed;

starting deceleration of the moveable section when one said rectilinear laser beam reaches a speed control point located immediately adjacent the stationary section;

moving the moveable section at a final crawl speed when a second said rectilinear laser beam reaches the speed control point, the moveable section continuing to move at said final crawl speed towards said stationary section; and progressively muting each rectilinear laser beam as it progressively passes the speed control point such that intersection of a muted portion of the rectilinear laser beam by an object will not prevent motion of the moveable section.

52. A safety system for an industrial press having a moveable section, the safety system including:
a laser device for emitting a plurality of parallel continuous planar laser beams having a generally constant lateral width;
a light receiver for receiving the planar laser beams and for detecting when an object intersects at least one of the planar laser beams; and
a controller for stopping or preventing motion of the moveable section when the light receiver detects that at least one of the planar laser beams has intersected an object,
said controller further adapted to decelerate the moveable section from a first speed to a second speed within a deceleration zone, said zone defined between a first point at which a first planar laser beam passes a speed control point and a second point at which a second planar laser beam passes the speed control point;
wherein as each planar laser beam passes the speed control point, the planar laser beam is muted such that intersection of the planar laser beam by the object will not prevent motion of the moveable section.

53. The safety system according to claim 52 wherein the first and second planar laser beams are adjacent.

54. The safety system according to claim 52 wherein the laser device includes a plurality of laser emitters for respectively emitting a laser beam and a lens assembly for respectively converting each said laser beam emitted from a said laser emitter to a said continuous planar laser beam.

55. The safety system according to claim 54 wherein the lens assembly includes a cylindrical prism for initially expanding each planar laser beam into a planar fan-shaped laser beam and a converging lens for refocusing the fan-shaped laser beam to a planar laser beam having a generally constant lateral width.

56. The safety system according to claim 55 wherein the lens assembly is used to convert each laser beam to facilitate the correct alignment of the final planar laser beam.

57. The safety system according to claim 55 wherein peripheral edges of the plane defined by the planar laser beam extend laterally beyond opposing sides of the moveable section.

58. The safety system according to claim 52 further including a plurality of laser devices used to provide the continuous planar laser beams.

59. The safety system according to any one of claims 52-57 wherein a single light receiver is used to receive the planar laser beams.

60. The safety system according to claim 52 wherein the light receiver includes an array of light receiving elements, the elements being aligned along a common axis and located at an end of a receiver body of the light receiver.

61. The safety system according to claim 60 wherein a cylindrical lens is provided to focus the planar laser beams onto the light receiver array.

62. The safety system according to claim 52 wherein the planar laser beams are multiplexed such that each laser beam is sequentially turned off and on creating pulses so that the light receiver only detects one of said planar laser beams at one time.

63. The safety system according to claim 62 wherein the pulses are created at a pre-determined pulse rate.

64. The safety system according to claim 52 wherein the muted planar laser beam is still pulsed and speed measurement is still possible.

65. A safety system for an industrial press having a moveable section, the safety system including:
a laser device for emitting a continuous beam of rectilinear cross-section having a generally constant lateral width and generally constant depth;
said rectilinear beam having a proximate and distal face relative to a leading edge of the moveable section;
a light receiver for receiving the rectilinear beam and for detecting when an object intersects at least a portion of the beam; and
a controller for stopping or preventing motion of the moveable section when the light receiver detects that at least a portion of the rectilinear beam has intersected an object,
said controller further adapted to decelerate the moveable section from a first speed to a second speed within a deceleration zone, said zone defined between a first point at which the proximate face passes a speed control point and a second point at which the distal face passes the speed control point;
wherein as the rectilinear beam progressively passes the speed control point, the rectilinear beam is correspondingly progressively muted such that intersection of the rectilinear beam at a muted portion of the rectilinear beam by the object will not prevent motion of the moveable section.

66. The safety system according to claim 65 wherein the speed measurement is performed by the controller measuring a number of pulses at a pulse rate as the moveable section travels a predetermined distance.

67. The safety system according to claim 66 wherein the predetermined distance is bisected by the speed control point.

68. The safety system according to claim 67 wherein the predetermined distance is 2 mm commencing 1 mm above the speed control point and finishing 1 mm below the speed control point.

69. The safety system according to claim 65 wherein the first speed is a maximum operating speed of the industrial press.

70. The safety system according to claim 69 wherein the second speed is a final crawl speed.

71. The safety system according to claim 70 wherein the controller decelerates the moveable section at a rate such that the speed of the moveable section at a mid point between the first point and second point that passes the speed control point is 50% of the operating speed of the industrial press.

72. The safety system according to claim 71 wherein if the speed measurement detects a speed exceeding the first speed at the first point, the final crawl speed at the second point or 50% of the operating speed at the mid point, then the controller will stop the moveable section by turning off the industrial press.

73. The safety system according to claim 65 wherein the muted portion of the rectilinear beam is still pulsed and speed measurement is still possible.

74. The safety system according to claim 65 wherein the speed control point is located 2 mm above a surface of material operated on by the industrial press.

75. The safety system according to claim 65 wherein the depth of the rectilinear beam is 10 mm.

76. The safety system according to claim 65 wherein the proximate face and the moveable section are spaced along an axis parallel to the movement of the moveable section by 4 mm.

77. The safety system according to claim 72 wherein the final crawl speed is 20 mm per second.

78. The safety system according to claim 77 wherein the controller further decelerates the moveable section from the second point to a third point, said third point located at which the leading edge of the moveable section passes the speed control point.

79. The safety system according to claim 78 wherein the moveable section is decelerated from 20 mm per second to 10 mm per second between the second point and the third point.

80. The safety system according to claim 65 wherein the laser device includes a plurality of laser emitters for respectively emitting a laser beam and a lens assembly for respectively converting each said laser beam emitted from a said laser emitter to a said continuous rectilinear laser beam.

81. The safety system according to claim 80 wherein the lens assembly includes a first cylindrical prism for initially expanding the or each laser beam into a planar fan-shaped laser beam in one plane, a first converging lens for refocusing the fan-shaped laser beam to a planar laser beam having the generally constant lateral width, a second cylindrical prism, orthogonal to the first cylindrical prism, for expanding the planar laser beam into a prismatic fan-shaped laser beam and a second converging lens for refocusing the prismatic fan-shaped laser beam to a rectilinear laser beam having both the generally constant lateral width and the generally constant depth.

82. The safety system according to claim 65 wherein the light receiver includes a two dimensional away of light receiving elements, the elements being placed in a rectilinear distribution and located at an end of a receiver body of the light receiver.

83. The safety system according to claim 65 said rectilinear beam further including a rectilinear portion of depth sufficient to span from the proximate face to a partial intersection with the leading edge of the moveable section, said rectilinear portion having the generally constant lateral width, wherein the light receiver further includes light receiving elements corresponding to the rectilinear portion, such that the light receiving elements corresponding to an area where the moveable section intersects with the rectilinear portion do not function to prevent movement of the moveable section.

84. A safety system for an industrial press having a moveable section, the safety system including:
a laser device for emitting a continuous beam of rectilinear cross-section having a generally constant lateral width and generally constant depth;
said rectilinear beam having a proximate and distal face relative to a leading edge of the moveable section;
a light receiver for receiving the rectilinear beam and for detecting when an object intersects at least a portion of the beam; and
a controller for stopping or preventing motion of the moveable section when the light receiver detects that at least a portion of the rectilinear beam has intersected an object,
said controller further adapted to decelerate the moveable section from a first speed to a second speed within a deceleration zone, said zone defined between a first point at which the proximate face passes a speed control point and a second point at which the distal face passes the speed control point;
said rectilinear beam further including a rectilinear portion of depth sufficient to span from the proximate face to a partial intersection with the leading edge of the moveable section, said rectilinear portion having the generally constant lateral width, wherein the light receiver further includes light receiving elements corresponding to the rectilinear portion, such that the light receiving elements corresponding to an area where the moveable section intersects with the rectilinear portion do not function to prevent movement of the moveable section.

85. The safety system according to claim 84 wherein the speed measurement is performed by the controller measuring a number of pulses at a pulse rate as the moveable section travels a predetermined distance.

86. The safety system according to claim 85 wherein the predetermined distance is bisected by the speed control point.

87. The safety system according to claim 86 wherein the predetermined distance is 2 mm commencing 1 mm above the speed control point and finishing 1 mm below the speed control point.

88. The safety system according to claim 84 wherein the first speed is a maximum operating speed of the industrial press.

89. The safety system according to claim 88 wherein the second speed is a final crawl speed.

90. The safety system according to claim 89 wherein the controller decelerates the moveable section at a rate such that the speed of the moveable section at a mid point between the first point and second point that passes the speed control point is 50% of the operating speed of the industrial press.

91. The safety system according to claim 90 wherein if the speed measurement detects a speed exceeding the first speed at the first point, the final crawl speed at the second point or 50% of the operating speed at the mid point, then the controller will stop the moveable section by turning off the industrial press.

92. The safety system according to claim 91 wherein the final crawl speed is 20 mm per second.

93. The safety system according to claim 92 wherein the controller further decelerates the moveable section from the second point to a third point, said third point located at which the leading edge of the moveable section passes the speed control point.

94. The safety system according to claim 93 wherein the moveable section is decelerated from 20 mm per second to 10 mm per second between the second point and the third point.

95. The safety system according to claim 84 wherein the speed control point is located 2 mm above a surface of material operated on by the industrial press.

96. The safety system according to claim 84 wherein the depth of the rectilinear beam is 10 mm.

97. The safety system according to claim 84 wherein the proximate face and the moveable section are spaced along an axis parallel to the movement of the moveable section by 4 mm.

98. The safety system according to claim 84 wherein the laser device includes a plurality of laser emitters for respectively emitting a laser beam and a lens assembly for respectively converting each said laser beam emitted from a said laser emitter to a said continuous rectilinear laser beam.

99. The safety system according to claim 98 wherein the lens assembly includes a first cylindrical prism for initially expanding the or each laser beam into a planar fan-shaped laser beam in one plane, a first converging lens for refocusing the fan-shaped laser beam to a planar laser beam having the generally constant lateral width, a second cylindrical prism, orthogonal to the first cylindrical prism, for expanding the planar laser beam into a prismatic fan-shaped laser beam and a second converging lens for refocusing the prismatic fan-shaped laser beam to a rectilinear laser beam having both the generally constant lateral width and the generally constant depth.

100. The safety system according to claim 84 wherein the light receiver includes a two dimensional array of light receiving elements, the elements being placed in a rectilinear distribution and located at an end of a receiver body of the light receiver.

* * * * *